UNITED STATES PATENT OFFICE.

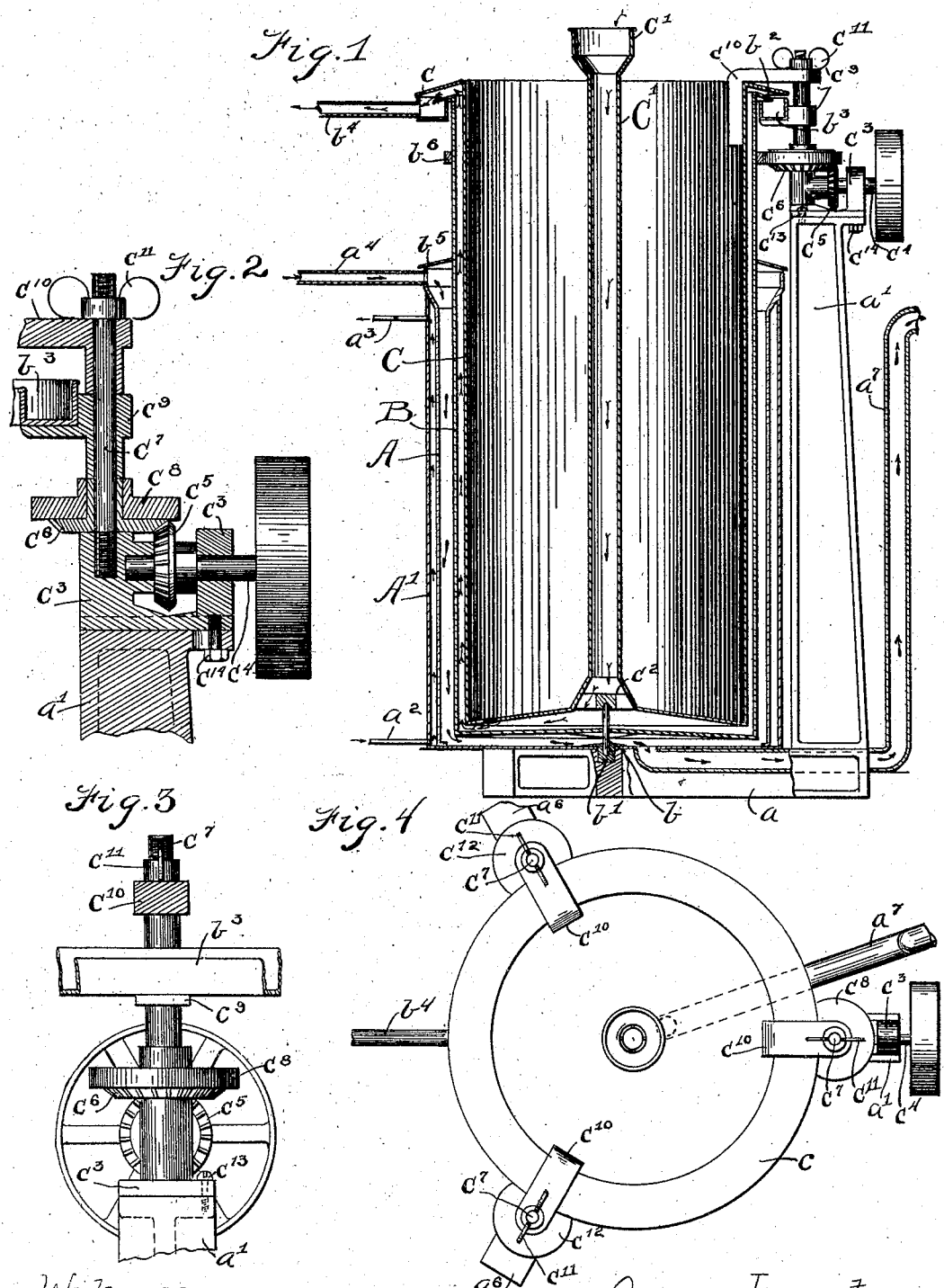

LEE STURGES, OF ELMHURST, ILLINOIS.

TEMPERING-MACHINE FOR PASTEURIZING.

No. 806,206.     Specification of Letters Patent.     Patented Dec. 5, 1905.

Application filed June 24, 1904. Serial No. 213,919.

*To all whom it may concern:*

Be it known that I, LEE STURGES, a citizen of the United States, and a resident of Elmhurst, Dupage county, Illinois, have invented certain new and useful Improvements in Tempering-Machines for Pasteurizing; and I do hereby declare that the following is a full, clear, and exact description of the same, reference being had to the accompanying drawings, and to the letters of reference marked thereon, which form a part of this specification.

This invention relates to improvements in tempering-machines, and more particularly to a tempering-machine adapted for use intermediate a heater and a cooler in pasteurizing.

Heretofore in pasteurizing fluids such as milk the milk has been delivered into and heated in one machine and successively passed therefrom through others adapted for successively cooling the same. When so conducted, the operation requires a large expenditure of steam to raise the cold fluid to the pasteurizing temperature—approximately 160° or 170° Fahrenheit—and after passing from the heater a large quantity of the cold water or other cooling agent is required to reduce the milk to the temperature desired at delivery.

The object of this invention is to provide a tempering-machine adapted for use intermediate the heating-machine and the cooling-machine and designed to first receive the milk therein and so constructed and operated as to raise the temperature of the milk preliminary to the delivery to the heater and also acting to cool the milk delivered from the heater thereto preliminary to delivery to the cooling-machine, thus accomplishing a large saving in the amount of heat energy required in raising the milk to the desired temperature and also economizing in the amount of water or other cooling agent required in cooling the same at the conclusion of the operation.

The invention has for its object the construction of a strong, simple, and compact machine capable of being taken apart readily for cleansing and so constructed as to render the operation thereof both in heating and cooling the milk entirely automatic, requiring no attention whatever from an operator.

The invention embraces many novel features; and it consists in the matters hereinafter described, and more fully pointed out and defined in the appended claims.

In the drawings, Figure 1 is a central vertical section of a machine embodying my invention. Fig. 2 is an enlarged sectional detail of the driving mechanism and one of the adjustable brackets. Fig. 3 is an inner or face elevation of the same. Fig. 4 is a fragmentary top plan view of the machine.

As shown in said drawings, said machine is constructed wholly of metal and comprises three metallic cylinders, preferably of tinned copper, and indicated by A, B, and C, nested one within the other, as shown in Fig. 1, and so arranged and supported as to permit the middle cylinder B to revolve freely between the outer and the inner cylinders A and C, while the latter are held stationary. As shown, inasmuch as the usual wooden or other tub is omitted (though obviously the same could be used, if desired) the outer cylinder A is supported upon a suitable base or foundation $a$, provided on three sides with upwardly-extending standards $a'$ $a^6$, upon which is supported the driving mechanism hereinafter described. As shown, said outer cylinder A is jacketed by an outer shell A', which may be constructed of wood and comprise a tub; but in the present instance it is shown constructed of sheet metal and is provided at the bottom and top thereof with an inlet-pipe $a^2$ and an outlet-pipe $a^3$, respectively, to admit cold water or other cooling fluid into the jacket or the space between said outer cylinder and the casing A'. Said outer cylinder A is flared outwardly at its top to afford a receiving-gutter, and connected therein, also at the top, is an inlet-pipe $a^4$, which opens into said gutter between said outer cylinder and the middle cylinder B and returns the milk thereto from the heater, which may be of any kind and is not shown. The middle cylinder B is provided axially in its bottom with an upwardly and downwardly extending pivot-pin $b$, which at its lower end engages on a central bearing $b'$ in the bottom of the outer cylinder A. The upper end of the pivot-pin affords a bearing for the inner cylinder or can C, as shown in Fig. 1. Said middle cylinder extends above the top of the outer cylinder and is flanged outwardly and downwardly at its top, the periphery of said flange (indicated by $b^2$) extending over and into a stationary receiving-trough $b^3$, supported from said standards $a'$ $a^6$. A pipe $b^4$ communicates with said trough and delivers the partly-heated milk to the heater, which may be of any desired type, but conveniently may be such as that set forth in my prior patent, "Apparatus for pasteurizing milk," issued July 14, 1903, No. 733,604. Rigidly secured on said cylinder B above the top of the outer cylinder A is a downwardly and outwardly extending flange $b^5$, which extends beyond the periphery of the said outer cylinder and covers the open end thereof, acting to exclude dust therefrom.

The inner cylinder C, which fits within the cylinder B, extends above the same and is provided at its upper end with a peripheral downwardly and outwardly inclined flange $c$, which extends beyond and covers the trough $b^3$ and serves to protect the fluid flowing therethrough from contamination. Rigidly secured at the axis of said inner cylinder is an intake-pipe C', provided at its upper end with an enlarged or funnel mouth $c'$, into which the milk or fluid to be pasteurized is delivered. Said pipe at its lower end is also somewhat enlarged and opens through the bottom of said cylinder C and is provided centrally with a bearing-piece $c^2$, which engages upon the top of the pivot-pin $b$ on which said cylinder is supported. The cylinder C is held from rotation and the middle cylinder B is rotated from mechanism supported on the standards $a'$ and $a^6$. The driving mechanism comprises, as shown, a bracket $c^3$, secured on the upper end of the standard $a'$ and in which is journaled a horizontal stud-shaft $c^4$, provided at its outer end with a belt-pulley and at its inner end with a beveled pinion $c^5$, which meshes with a beveled gear $c^6$, journaled upon a vertical shaft $c^7$, which, as shown, is threaded in said bracket $c^3$. Rigidly secured upon said beveled gear $c^6$ is a friction-roller $c^8$, which may be of any suitable material to afford sufficient friction with the outer surface of the cylinder B or with the peripheral rib $b^6$ upon which said roller tracks. Similar brackets are secured on the standards $a^6$, in which like friction-rollers $c^{12}$ are journaled, which serve as idlers and bear against said rib $b^6$ and support the cylinder against the action of the friction-roller $c^8$. On the shaft $c^7$ in each bracket a bracket-arm $c^9$ is secured, which projects beneath and supports the trough $b^3$, and at the upper end of each of said shafts is a hooked bracket $c^{10}$, which extends into and engages the cylinder C, holding the same from rotation. A wing-nut $c^{11}$ engages the upper end of the shaft and holds the parts in operative relation.

Connected in the bottom of the outer cylinder A is a delivery-pipe $a^7$, adapted to deliver the treated milk to a cooler of the usual or any preferred type.

The operation is as follows: The milk to be treated is delivered into the intake-pipe C' and flows into the space between the cylinders C and B and thence into the annular trough $b^3$, and thence to the heater of any preferred type, where it is raised to a pasteurizing temperature—approximately 160° or 170°. The heated fluid is then returned to the outer cylinder A through the pipe $a^4$ and passes downwardly between the cold-water jacket inclosing said cylinder and the surface of the middle cylinder B, which is cooled by the milk in flowing upwardly on the other side and at last flows out to the cooler through the pipe $a^7$. Inasmuch as the milk to be treated is delivered through the intake-pipe into the space between the inner and middle cylinders and flows upwardly separated from the hot milk only by the thin walls of the cylinder B, it is obvious that the hot milk contained between the walls of the cylinder B and the water-jacket acts to greatly raise the temperature of the milk flowing toward the heater and is in turn cooled thereby and by said exterior water-jacket. It follows that the inflowing milk is greatly raised in temperature by the heat absorbed from the heated milk and acts, together with the water-jacket, to cool the same, and thereby greatly economize both in time and energy required to raise the milk or fluid treated to the desired temperature. In the same manner the heated milk having been greatly cooled during its passage through the tempering-machine requires much less time and less cold water to reduce its temperature to the desired point than would otherwise be the case.

When it is desired to clean the machine, the wing-nuts $c^{11}$ are removed from the shaft $c^7$ and the bracket arms or clamps $c^{10}$ are removed, whereupon the cylinder B may be lifted out and thoroughly cleansed. If it is desired to remove the cylinder B, the set-screw $c^{13}$ is removed from the bracket $c^3$, whereupon the bracket, with the friction-roller and bracket-arm $c^9$, may be swung to one side, permitting the cylinder B to be removed, carrying the annular tank or trough therewith. Ordinarily it will be necessary only to release one of the brackets, though, if preferred, each of the brackets carrying the frictional drives $c^8$ and the idlers $c^{12}$ may be turned to one side to afford greater clearance for the can.

Obviously many details of construction may be varied without departing from the principles of my invention.

I claim as my invention—

1. A tempering-machine for pasteurizing comprising a stationary, jacketed cylinder having a gutter at the top thereof of a revoluble cylinder therein and extending above the same, an inner stationary cylinder and a flange rigidly engaged on the revolving cylinder adapted to close said gutter.

2. A tempering-machine for pasteurizing, comprising a jacketed cylinder having a gutter at the upper end thereof, a rotative cylinder therein, extending above the jacketed cylinder, a peripheral flange thereon, adapted to close said gutter, an inner cylinder, a supply-pipe at the axis thereof, means adapted to hold the inner cylinder stationary and means for rotating the rotative cylinder.

3. A tempering-machine adapted to be connected between a heater and a cooler in pasteurizing comprising a jacketed cylinder having an inlet and outlet pipe opening into said jacket, a bearing at the bottom of said cylinder, a revolving cylinder in said jacketed cylinder, a pin in the bottom thereof adapted to seat in said bearing, an inner stationary cylinder seated on the upper end of said pin, a plurality of standards, an annular trough carried thereon above the jacketed cylinder, a flange on said revolving cylinder projecting into said trough, a flange on the stationary cylinder adapted to cover said trough and a peripheral flange on the side of the revolving cylinder adapted to extend over and cover the upper end of said jacketed cylinder.

4. In a machine of the class described the combination with an inner, an outer and a middle cylinder of heat-conducting material of means for revolving the middle cylinder, a receiving-gutter at the top of the inner cylinder, a delivery-trough at the top of the other cylinders, outwardly-directed flanges covering said gutter and trough and means for rotating the middle cylinders.

5. In a machine of the class described means for conducting two oppositely-flowing thin sheets of milk of different temperatures therethrough comprising, a revoluble cylinder between said sheets, a water-jacket adjacent the outer sheet and a stationary cylinder adjacent the inner sheet, said revoluble and stationary cylinders being extended above the water-jacket.

6. In a device of the class described the combination with a jacketed cylinder of a gutter at the top thereof, a frame adapted to support said cylinder, upwardly-directed standards thereon extending above said cylinder, a rotary cylinder in said jacketed cylinder affording therewith an annular chamber for the reception of heated milk, a stationary cylinder in said rotative cylinder affording therewith an annular chamber, for the reception of cold milk flowing oppositely from the heated milk, an axial feed-pipe therein, rollers carried on said standards adapted to rotate the rotary cylinder and brackets carried on said standards adapted to engage in the stationary cylinder and hold it from movement.

In testimony whereof I have hereunto subscribed my name in the presence of two subscribing witnesses.

LEE STURGES.

Witnesses:
C. M. HILLS,
HJALMAR S. RUDD.